United States Patent Office
3,574,711
Patented Apr. 13, 1971

3,574,711
PRODUCTION OF ALKYL CARBAMATES
Max O. Robeson, Salisbury, N.C., assignor to Proctor Chemical Company, Inc., Salisbury, N.C.
No Drawing. Filed May 14, 1968, Ser. No. 728,916
Int. Cl. C07c 103/12
U.S. Cl. 260—482    7 Claims

ABSTRACT OF THE DISCLOSURE

Use of zinc compounds as catalysts greatly increase product yield, reduce reaction time and provide further improvements over known methods of producing alkyl carbamates by reaction of an alkanol with urea. Zinc oxide is most effective as the catalyst and permits a product yield of above 90% in production of n-butyl carbamate from butanol and urea. The products may be reacted with formaldehyde to form methylol derivatives that are effective as textile crease-proofing agents.

BACKGROUND OF THE INVENTION

It is known that alkyl carbamates may be prepared by a variety of general chemical reactions. This invention relates to improvements in one of these and is particularly concerned with the preparation of n-butyl carbamate which is used as the end product in the following delineation of possible chemical reactions for production of alkyl carbamates:

(1) n-Butanol may be reacted with phosgene to form the chloroformate ester followed by reaction with ammonia.

$$C_4H_9OH + COCl_2 \rightarrow C_4H_9OCOCl + HCl$$

$$C_4H_9OCOCl + 2NH_3 \rightarrow C_4H_9OCONH_2 + NH_4Cl$$

This process is not attractive because it involves handling phosgene, liberation of corrosive HCl, and making byproduct ammonium chloride.

(2) A lower carbamate such as methyl carbamate may be transesterified with butanol to form butyl carbamate.

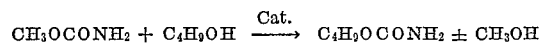

This method works well, but has the disadvantage of destroying one carbamate to produce another. However, this reaction may be driven to completion by distilling off the methanol produced.

(3) Reaction of butanol with urea to form butyl carbamate.

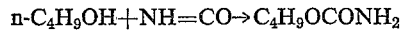

The synthesis of n-butyl carbamate from butanol plus urea is described in "Organic Syntheses," Collective Volume I, second edition (1951), pages 140–142 (published by John Wiley and Son, New York). The process is noncatalytic, uses a large excess of butanol (4 to 1 mole ratio) and requires 30 hours reaction time. After distilling to remove excess butanol, the residue is taken up to ligroin, boiled, filtered, and followed by several washings to separate undissolved cyanuric acid from product. The ligroin filtrate containing butyl carbamate is distilled to reclaim ligroin followed by fractionation to obtain high purity product in about 75% yield.

It would be of benefit to the chemical process industry to have available a more simple and economical route to butyl carbamate. This carbamate is needed for conversion to methylol derivatives that find valuable application as textile finishing agents.

OBJECTS

A principal object of the present invention is the provision of improved methods for the production of alkyl carbamates. Further objects include the provision of:

(1) Improvements in the production of methylol derivatives of alkyl carbamates, particularly n-butyl carbamate.

(2) A method for the production of n-butyl carbamate to produce a reaction product of sufficient purity to convert to the methylol derivative as represented by the equation:

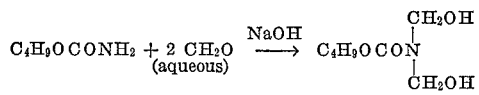

(3) A special technique to decompose complexes of zinc compounds with alkyl carbamates and remove the zinc compound as an inorganic precipitate.

(4) A new method for the production of butyl carbamate as a reaction product which can be converted directly in a satisfactory manner into the methylol derivative without consuming abnormal amounts of caustic or of formaldehyde.

(5) A catalytic process for the production of butyl carbamate in a higher percentage yield and with more favorable ratios of reactants than has been possible with methods known heretofore for the production of butyl carbamate by reaction of butanol with urea.

(6) Information as to how reaction time can be decreased in production of butyl carbamate from butanol and urea and at the same time reducing or eliminating entirely formation of byproducts such as cyanuric acid, ammonium carbamate and ammonium carbonate.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope or fair meaning of the appended claims.

SUMMARY OF THE INVENTION

These objects are accomplished according to the present invention by the production of alkyl carbamates through reaction of an alkanol with urea and carrying out the reaction in the presence of a catalytic amount of a zinc compound.

A variety of zinc compounds are effective in accelerating the reaction between urea and an alkanol as compared with use of no catalyst at all, e.g., zinc acetate. However, zinc oxide is advantageously used as the catalyst. Most efficient use of the catalyst is obtained when it constitutes between about 0.1 to 2% of the combined weight of alkanol and urea used in the reaction.

One advantageously conducts the reaction at a temperature of about 100 to 150° C. and employs about 2 to 4 moles of alkanol for each mole of urea. The new methods are preferably employed for the production of n-butyl carbamate by reaction of normal n-butanol with urea in a mole ratio of about 2–4 moles of butanol for each mole of urea in the presence of between about 0.1 to 2% by weight of zinc oxide based upon the combined weight of butanol and urea and at a temperature of 100 to 150° C. Excess butanol in the reaction is advantageously recovered by vacuum distillation of the reaction mixture and recovery of the desired product as a residue from such distillation.

Advantageously, one treats the reaction product with phosphoric acid or a hydrogen phosphate salt, e.g., dibasic sodium phosphate, to break any complex which may exist in the reaction product between zinc oxide and the alkyl carbamate. This treatment results in precipitation of zinc from the reaction mixture as zinc phosphate.

Butyl carbamate produced in this manner is particularly effective for the production of methylol derivatives by reaction with formaldehyde or formaldehyde yielding donors. By contrast to butyl carbamate produced by prior known methods as disclosed in "Organic Syntheses," volume I, supra, the product butyl carbamate produced by the new methods can be converted directly to the methylol derivative without abnormal requirements of caustic or undesirable excess consumption of formaldehyde.

The success of the present invention is due to several discoveries which may be summarized as follows:

(A) Yields are about 20% higher even with 2 to 1 mole ratio as compared to 4 to 1 for a noncatalytic process. By-products are reduced to a minimum thus simplifying purification. The fact that a 2 to 1 mole ratio can be used successfully means that much greater poundage of product can be made in the same size vessel.

(B) Reaction time is decreased from 30 hours to 19 hours when using 0.6% concentration of catalyst. Increasing the catalyst concentration to 1.2% decreases the reaction time to 9 hours.

(C) Higher yields of product makes the system easier to operate. With no catalyst present, by-products such as cyanuric acid, ammonium carbamate, and ammonium carbonate are formed.

DESCRIPTION OF PREFERRED EMBODIMENTS

Example 1.—Preparation of butyl carbamate

| Reaction charge | Wt., parts | Percent |
|---|---|---|
| n-Butanol | 592 | 70.7 |
| Urea | 240 | 28.7 |
| ZnO | 5 | 0.6 |
| Total | 837 | 100.0 |

The urea and catalyst were added to the butanol in a glass reaction vessel equipped with reflux condenser, stirrer, and thermometer. A vent line from the vertical condenser was connected through a Dry Ice trap to measure liberated by-product ammonia as a liquid. The mixture was heated and refluxed for 19 hours during which time the pot temperature rose from 119° C. to 134° C. The reaction mixture was cooled to 60° C.

The pressure in the reaction vessel was reduced gradually to 30 mm. Hg a. and excess butanol was distilled off through a short glass conduit and condensed. This alcohol was saved for re-use. During reduced pressure distillation of the butanol, the pot temperature rose from 60° C. to 113° C. The top temperature was in the range of 50–60° C.

During the course of these operations, there were produced 63.5 parts of ammonia, there was recovered 308 parts of butanol and 430 parts of butyl carbamate as residue. Based on urea charged, the theoretical amounts would be 68 parts $NH_3$, 296 parts recovered butanol and 468 parts butyl carbamate. Accordingly, the yield in terms of produced ammonia was 94%, in terms of recovered butanol was 96% and in terms of butyl carbamate was 92.5%. This operation was designated as Run A. In a duplicate operation, designated Run B, closely similar results were obtained as noted in Table I following.

TABLE I

|  | Run A, percent | Run B, percent |
|---|---|---|
| Based on $NH_3$ | 94 | 94 |
| Based on rec. BuOH | 96 | 96.2 |
| Based on Bu carbamate | 92.5 | 93 |

A small amount of ammonium carbamate and ammonium carbonate was produced as manifested by a coating of solids on the condenser wall. The yields figured by three different methods are in remarkable agreement.

Example 2.—Conversion to the methylol derivative

In the same reaction vessel as in Example 1, the 430 parts of butyl carbamate at 60° C. to keep it fluid (M.P. 53–55° C.) was treated as follows:

(a) Add 213 parts water and 9 parts sodium phosphate dibasic and allow to react for 0.5 hour. The pH was then 6.

(b) Adjust pH alkaline to about 10 by addition of 11 parts 25% NaOH. Add 748 parts 37% formalin over a half hour period while maintaining temperature in range of 60–70° C. Add 14 parts 25% NaOH to have alkalinity at about 10.5.

(c) Allow to react 2 hours at 60–70° C. for complete methylolation. Add 9 parts 85% $H_3PO_4$ to adjust pH to 7.0.

(d) Filter the product to remove precipitated zinc phosphate. For 5 parts starting ZnO, about 15 parts wet precipitate is obtained.

The final filtrate had the following properties:

Weight _____ 1416 parts.
Color _____ Near water-white.
pH _____ 7.0.
Solids content, percent _____ 50.
Free $CH_2O$, percent _____ 5.7.

Example 3.—Textile treatment with methylol derivative

The methylol derivative of butyl carbamate has limited solubility in water. The presence of a cationic catalyst, such as $MgCl_2$, in an aqueous solution of the derivative tends to further reduce solubility and lead to turbidity. It has been found this problem could be solved by adding a small amount, e.g., 0.1 to 1.0% of a surfactant, e.g., a polyethylene glycol ether of an alkanol like "Tergitol 15–S–9."

A textile treating bath was made by forming an aqueous solution from the following ingredients in the parts indicated:

Butyl carbamate methylol monomer of Example 2 ___ 20
Magnesium chloride tetrahydrate _____ 4
Surfactant (Tergitol 15-S-9) _____ 1
Water _____ 75

White cotton broadcloth was passed through the resulting finishing bath, squeezed to leave about 100% pick-up of solution and dried. The resulting fabric was then cured at 170° C. for 90 seconds. The final treated fabric possessed acceptable "wash-wear" value when tested by AATCC method No. 88A–1964T. The fabric also exhibited low chloride retention, low loss in tensile and tear properties and excellent light reflectance value.

DISCUSSION OF DETAILS

Zinc oxide has been found to be unusually effective as a catalyst for the production of alkyl carbamates by reaction of alkanols with urea. With zinc oxide, a product can be satisfactorily obtained even at a 2 to 1 mole ratio of alkanol to urea in a yield above 90%, e.g., 93–95%. The resulting product is of sufficient purity to be converted directly without further purification into a methylol derivative which is highly effective as a creaseproofing agent for cellulosic textiles.

Zinc acetate has been also found to exhibit moderate catalytic activity although not nearly as strong as zinc oxide. Other zinc compounds are contemplated for use in the new methods including zinc formate, zinc carbonate and compounds which will yield zinc oxide under the conditions of reaction such as zinc amide. In contrast, such materials as sodium hydroxide, potassium hydroxide, sodium acetate, tin chloride and lead acetate have been found to be ineffective as catalysts in the reaction.

The new methods are preferably used for the production of n-butyl carbamate by reaction of butanol with urea. The procedures may, however, be used for the production of other alkyl carbamates by reaction of alkanols which are known to react with urea to form alkyl carbamates, e.g., propyl carbamate from propanol and urea, amyl carbamate from amyl alcohol and urea and similar alkyl carbamates, particularly those from reaction of alkanols containing 2 to 6 carbon atoms.

The prior known non-catalytic process for the production of butyl carbamate by reaction of butanol with urea required a large excess of butanol relative to urea, i.e., a 4 to 1 mole ratio. It is possible in accordance with the present invention to use such proportions of butanol relative to urea. However, use of zinc compounds as catalysts permit the desired product to be obtained with lower mole ratios of butanol to urea, e.g., a 2 to 1 mole ratio or even lower, and obtain yields of desired product above 90%. Further, the catalyzed reaction can be conducted at a variety of temperatures, e.g., 50 to 150° C. although one advantageously uses a temperature of 100 to 150° C.

Excess butanol or other alkanol which is used in the process may be separated from the desired product in any suitable fashion. Removal of excess alkanol, however, is advantageously accomplished by vacuum or reduced pressure distillation of the alcohol leaving the desired product as a residue. Reduced pressures permitting distillation of alkanol in the range of 30–120° C. and especially 50–100° C. are useful.

The alkyl carbamates produced in accordance with the new methods may be used for any purpose for which alkyl carbamates are now known or would be subsequently found to be useful. A particularly important application of them and especially of butyl carbamate is in the formation of methylol derivatives by reaction with formaldehyde to produce products which are employed in the crease-proofing and other treatment of cotton or other cellulosic fabrics. The products of the new methods may be directly converted to methylol derivatives. However, as part of the new discoveries, it has been found that zinc oxide when used as a catalyst tends to form a complex with the resulting alkyl carbamate. This can be detrimental to the methylolation. For example, five parts of zinc oxide will complex about 100 parts of carbamate or 25% of the yield. Such a complex remains as a gelatinous mass during the methylolation giving an unsatisfactory and uneconomical result. It has been discovered that this complexing problem can be eliminated by the addition of a small amount of phosphoric acid or hydrogen phosphate salt, e.g., di-basic sodium phosphate, to the alkyl carbamate. Such phosphoric acid or salt addition results in a breaking of the complex with the zinc oxide catalyst and precipitation of the zinc value as zinc phosphate. Operating in this manner, the amount of formaldehyde required to form a useful methylol derivative of the butyl carbamate can be as low as 2.5 moles of formaldehyde per mole of carbamate. Analysis of the methylol derivative obtained under such conditions shows 1.77 moles formaldehyde to have reacted for each mole of butyl carbamate. Such high consumption of formaldehyde and degree of methylolation is remarkable for alkyl carbamates.

The methylol derivatives of butyl carbamate have limited solubility in water at ambient temperatures, i.e., 15–25° C. Moreover, in the presence of textile treating baths containing cationic catalysts, e.g., magnesium chloride, there is further reduction in the solubility of the methylol butyl carbamate. This leads to turbidity and limited utility of the textile treating baths. It has been discovered that this problem can be overcome by the addition of a small amount of a non-ionic detergent, particularly when the pH is adjusted with an acid such as hydrochloric acid or acetic acid to between about 4.5 to 5.5. Under these conditions, the methylol derivative of the butyl carbamate dissolves satisfactorily in the textile treatment bath making it possible to finish textile resins which after curing on cotton broadcloth provide good wash and wear characteristics, high wrinkle resistance, low chlorine retention, excellent light reflectance and high tensile and tear properties as compared with the untreated fabric.

Throughout the foregoing specification and in the accompanying claims, all parts or percentages are by weight.

The embodiments of the invention in which an exclusive property or right is claimed are defined as follows:

1. A method of making an alkyl carbamate by reaction of an alkanol containing 2 to 6 carbon atoms with urea which comprises carrying out the reaction in the presence of a catalytic amount of zinc oxide and treating the reaction product with phosphoric acid or hydrogen phosphate salt to break any complex formed between the catalyst and the desired product and precipitate zinc phosphate from the reaction mixture.

2. The method of claim 1 wherein the alkanol is amyl alcohol.

3. The method of claim 1 wherein said reaction is conducted at a temperature of about 100° to 150° C.

4. A method as claimed in claim 1 wherein the method involves reaction of n-butanol with urea to produce n-butyl carbamate.

5. A method as claimed in claim 4 wherein about 2 moles of n-butanol are reacted with each mole of urea.

6. A method as claimed in claim 5 wherein excess n-butanol is recovered by vacuum distillation of the reaction mixture.

7. A method as claimed in claim 1 wherein the phosphate treated product is reacted with formaldehyde to produce methylolated alkyl carbamate, the amount of formaldehyde used being between 1 to 4 moles for each mole of alkyl carbamate.

References Cited

UNITED STATES PATENTS 2,837,561   6/1958   Beinfest et al.

FOREIGN PATENTS 147,973   5/1962   U.S.S.R. _____ 260—482

CHARLES B. PARKER, Primary Examiner

P. J. KILLOS, Assistant Examiner

U.S. Cl. X.R.

23—55; 252—8.8